(No Model.)

R. C. FAY.
RIDING REVERSIBLE PLOW.

No. 536,949. Patented Apr. 2, 1895.

Witnesses.
A. M. Long
Alex. Scott

Inventor.
Richard C. Fay

THE NORRIS PETERS CO., PHOTO-LITHO., WASHINGTON, D. C.

UNITED STATES PATENT OFFICE.

RICHARD C. FAY, OF WASHINGTON, DISTRICT OF COLUMBIA.

RIDING REVERSIBLE PLOW.

SPECIFICATION forming part of Letters Patent No. 536,949, dated April 2, 1895.

Application filed January 23, 1895. Serial No. 535,872. (No model.)

*To all whom it may concern:*

Be it known that I, RICHARD C. FAY, a citizen of the United States, residing at Washington, in the District of Columbia, have invented a Riding Reversible Plow, which is fully set forth in the following specification and accompanying drawings, in which—

Figure 1:
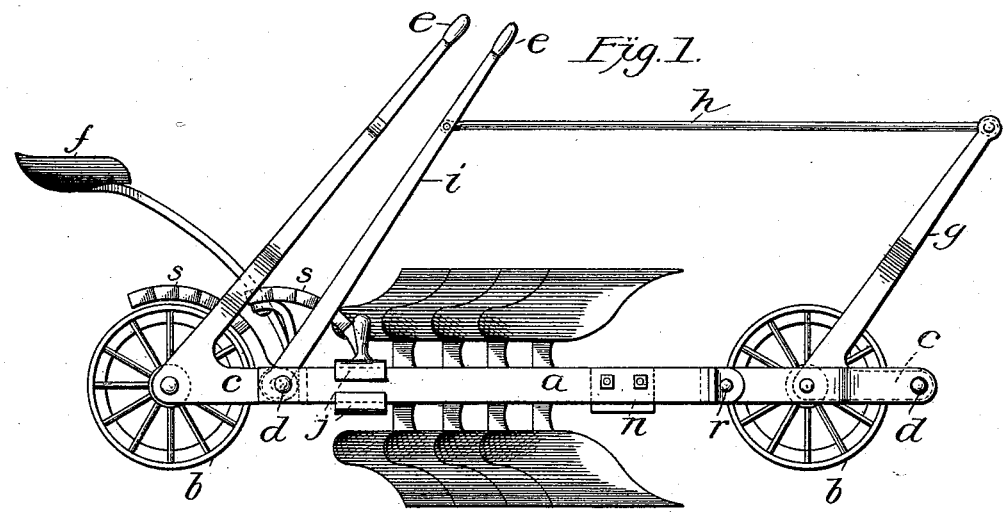
Figure 2:
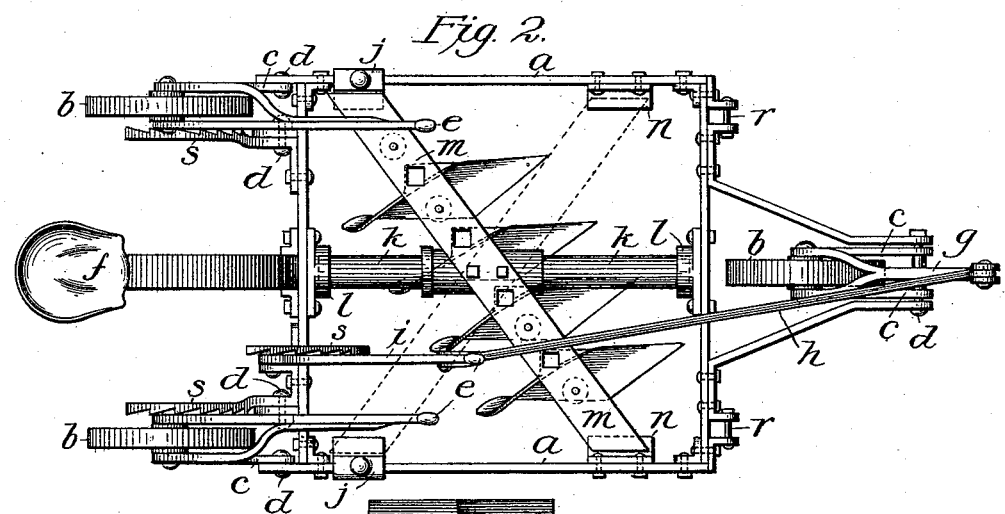
Figure 3:
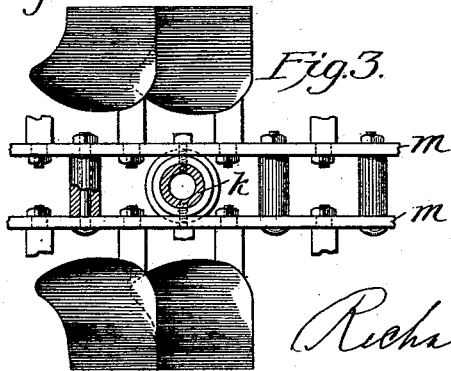

Figure 1 is a side view. Fig. 2 is a plan. Fig. 3 is a detail of the shaft in section and a part of the diagonal arm, with plows attached.

Similar letters refer to similar parts throughout the several views.

The object of my invention is to plow a field from side to side, without leaving any open furrows, and I attain this by carrying right and left plows, and use one set or the other at will. After plowing across the field, the frame is lifted with the levers, by the man on the seat. The upper set of plows is turned down, and continues the plowing back again, and so on completing the work as the plow travels from side to side of the field, from one end to the other.

For its construction, the horizontal frame $a$, is hinged at $d$, at the end of the short arm $c$, of the levers. The axles of the wheels $b$, form the fulcrum of the levers, the long arm of which is fitted with handles $e$, in reach of the man on the seat $f$. The horizontal shaft $k$, square or round, is placed in the center of the frame, from front to rear, with sockets or bearings $l$, in which the ends of the shaft turn and diagonally across the shaft, an arm is placed at or near the center and is secured in the best way to obtain firmness and to resist the pressure from the plows. The upper and lower pieces $m$, forming the diagonal arm are separated with spools and bolts to admit bolting the upper and lower set of plows between them. (See Fig. 3.)

At each side and in front of the frame, a ledge $n$, is placed to support the front end of the diagonal arm, and at each side and in the rear of the frame, a sliding ledge $j$, is fitted to the frame to lock and support the rear end of the diagonal arm. The ratchets $s$, hold the frame at any desired elevation, and, in front of the frame provision is made at $r$, for shafts or traces. In Fig. 2, the upper set of plows is omitted for the purpose of clearness.

For the manner of operating, after using the lower set of plows, and wishing to use the upper, the man on the seat, raises the front of the frame, by pulling on the handle of the lever $i$. The plows then leave the soil as they move along. He then pulls on the other two levers which raise the back of the frame, the ratchets keeping the frame in that position, and the plows are then clear of the surface of the soil. The man then pushes forward the sliding ledge $j$, which relieves the rear end of the diagonal arm, which end turns down and under the shaft $k$, to the other side, as shown in dotted lines Fig. 2. Then the sliding ledge $j$, is pulled under the end of the arm, locking it in position; and in that way either the upper or lower set of plows is used.

Having described my invention, what I claim, and desire to secure by Letters Patent, is—

1. In a reversible plow, the horizontal shaft, diagonal arm, and sliding ledges in the rear, at the sides of the frame for locking the same, substantially as described and shown for the purpose specified.

2. In a reversible plow, the horizontal shaft, diagonal arm and fixed ledges in front on the sides of the frame for supporting the same, substantially as described and shown for the purpose specified.

3. In a reversible plow, the combination of the horizontal frame carried at the end of the short arms of the levers, which are fulcrumed on the axles of the wheels; the revoluble horizontal shaft located in the center of the frame, carrying the diagonal arm provided with plows, and the sliding and fixed ledges, substantially as described and shown for the purpose specified.

RICHARD C. FAY.

Witnesses:
A. M. LONG,
ALEX. SCOTT.